United States Patent
Jonietz et al.

(10) Patent No.: US 11,420,584 B2
(45) Date of Patent: Aug. 23, 2022

(54) COVERING CAP FOR AN AIRBAG MODULE AND AIRBAG MODULE HAVING A COVERING CAP OF THIS TYPE

(71) Applicant: Dalphi Metal Espana, S.A., Vigo (ES)

(72) Inventors: Andreas Joachim Maria Jonietz, Vigo (ES); Luis Barandela Iglesias, Vigo (ES); Victor José Zalez Horta, Vigo (ES); Pedro Pereiro Coto, O Porrino (ES)

(73) Assignee: DALPHI METAL ESPANA S.A., Vigo (ES)

( * ) Notice: Subject to any disclaimer, the term of this patent is extended or adjusted under 35 U.S.C. 154(b) by 0 days.

(21) Appl. No.: 17/263,613

(22) PCT Filed: Aug. 5, 2019

(86) PCT No.: PCT/EP2019/071027
§ 371 (c)(1),
(2) Date: Jan. 27, 2021

(87) PCT Pub. No.: WO2020/030594
PCT Pub. Date: Feb. 13, 2020

(65) Prior Publication Data
US 2021/0291776 A1    Sep. 23, 2021

(30) Foreign Application Priority Data
Aug. 9, 2018  (DE) .......................... 202018104588.1

(51) Int. Cl.
*B60R 21/215* (2011.01)
*B60R 21/2165* (2011.01)
*B60R 21/203* (2006.01)

(52) U.S. Cl.
CPC ...... *B60R 21/215* (2013.01); *B60R 21/21658* (2013.01); *B60R 2021/21543* (2013.01)

(58) Field of Classification Search
CPC . B60R 21/203; B60R 21/215; B60R 21/2165; B60R 21/21656; B60R 2021/21543
See application file for complete search history.

(56) References Cited

U.S. PATENT DOCUMENTS 6,135,489 A * 10/2000 Bowers ............... B60R 21/2165
                                                        280/728.3
6,247,724 B1 * 6/2001 Jambor ............. B60R 21/21656
                                                        280/728.2
(Continued)

FOREIGN PATENT DOCUMENTS

DE    102004046866    4/2005
EP        0899170     3/1999
(Continued)

OTHER PUBLICATIONS

Machine translation of DE 10 2004 046 866 A1. Retrieved from Internet Oct. 8, 2021. (Year: 2021).*

*Primary Examiner* — Barry Gooden, Jr.
(74) *Attorney, Agent, or Firm* — Tarolli, Sundheim, Covell & Tummino LLP

(57) ABSTRACT

The invention relates to a cover cap (10) for an airbag module (12), especially for a driver airbag module, comprising a front panel (14) including an outer face (16) as well as an opposed inner face (18) which in the assembled state of the airbag module (12) faces a folded airbag (20), and an emblem (22) including two separate emblem elements (24, 26) fastened to the front panel (14), wherein the front panel (14) has a tear line (32) along which the cover cap (10) tears upon activation of the assembled airbag module (12), and wherein the tear line (32) extends between the two separate emblem elements (24, 26). Furthermore, the invention also includes an airbag module (12) comprising said cover cap (10).

17 Claims, 3 Drawing Sheets

(56) References Cited

U.S. PATENT DOCUMENTS

| | | | |
|---|---|---|---|
| 6,422,602 B1* | 7/2002 | Ishii | B60Q 5/003 280/728.2 |
| 6,550,803 B1* | 4/2003 | Derrick | B60R 21/2165 280/728.3 |
| 6,966,575 B2* | 11/2005 | Kobayashi | B60R 21/2165 280/728.3 |
| 10,000,175 B2* | 6/2018 | Coon | B60R 21/2165 |
| 2001/0017460 A1* | 8/2001 | Igawa | B60R 21/237 280/731 |
| 2002/0005631 A1* | 1/2002 | Varcus | B60R 21/203 280/728.3 |
| 2002/0014764 A1* | 2/2002 | Anglsperger | B60R 21/216 280/743.1 |
| 2002/0030352 A1* | 3/2002 | Iida | B60R 21/21656 280/728.3 |
| 2002/0050704 A1* | 5/2002 | Abe | B60R 21/21656 280/743.1 |
| 2003/0178819 A1* | 9/2003 | Schneider | B60R 21/21656 280/728.3 |
| 2003/0209889 A1* | 11/2003 | Erwin | B60R 21/21656 280/728.3 |
| 2004/0021303 A1* | 2/2004 | Ford | B60R 21/21656 280/728.3 |
| 2004/0130131 A1* | 7/2004 | Thomas | B60R 21/2035 280/731 |
| 2004/0174002 A1* | 9/2004 | Sauer | B60R 21/2165 280/728.3 |
| 2005/0079305 A1* | 4/2005 | Krappmann | B29C 45/73 428/35.7 |
| 2005/0156408 A1* | 7/2005 | Amamori | B60R 21/21656 280/728.3 |
| 2005/0275197 A1* | 12/2005 | Kaifuki | B60R 21/21656 280/728.3 |
| 2007/0290487 A1* | 12/2007 | Kreuzer | B60R 21/21656 280/728.3 |
| 2008/0036184 A1* | 2/2008 | Takagi | B60R 21/21656 280/728.3 |
| 2008/0079241 A1* | 4/2008 | Fujimori | B60R 21/21656 280/727 |
| 2008/0252050 A1 | 10/2008 | Aparicio et al. | |
| 2009/0058055 A1* | 3/2009 | Fujimori | B60R 21/21656 280/731 |
| 2009/0218793 A1* | 9/2009 | Kraus | B60R 21/21656 280/728.3 |
| 2011/0101653 A1* | 5/2011 | Rick | B60R 21/21656 280/728.3 |
| 2011/0109066 A1* | 5/2011 | Rick | B60R 21/21656 280/728.3 |
| 2011/0116251 A1* | 5/2011 | Rick | B60Q 3/68 362/84 |
| 2012/0074672 A1* | 3/2012 | Iida | B60R 21/21656 280/728.2 |
| 2013/0277952 A1* | 10/2013 | Jung | B60R 21/21656 280/728.3 |
| 2013/0285355 A1* | 10/2013 | Muramatsu | B60R 21/2165 280/728.3 |
| 2014/0145419 A1* | 5/2014 | Ishikawa | B60R 21/215 280/728.3 |
| 2015/0251625 A1* | 9/2015 | Bana Castro | B60R 21/2155 280/728.3 |
| 2017/0113644 A1* | 4/2017 | Coon | B60R 21/2165 |
| 2017/0259773 A1* | 9/2017 | Einarsson | B60R 21/2035 |
| 2019/0126881 A1* | 5/2019 | Rilat | B60R 21/2165 |
| 2021/0284095 A1* | 9/2021 | Jonietz | B60R 21/215 |

FOREIGN PATENT DOCUMENTS

| | | |
|---|---|---|
| EP | 1495921 | 1/2005 |
| WO | 2015144313 | 1/2015 |

\* cited by examiner

COVERING CAP FOR AN AIRBAG MODULE AND AIRBAG MODULE HAVING A COVERING CAP OF THIS TYPE

RELATED APPLICATIONS

This application corresponds to PCT/EP2019/071027, filed Aug. 5, 2019, which claims the benefit of German Application No. 20 2018 104 588.1, filed Aug. 9, 2018, the subject matter of which are incorporated herein by reference in their entirety.

BACKGROUND OF THE INVENTION

The invention relates to a cover cap for an airbag module, especially for a driver airbag module, as well as to an airbag module for a vehicle occupant restraint system comprising said cover cap.

Driver airbag modules usually are accommodated in the hub area of a vehicle steering wheel and, as a rule, comprise a module cover facing the occupant including an emblem fastened to the module cover. An emblem in this context is understood to be a logo of the car manufacturer, a lettering and/or any other decorating element, for example, which is attached to the cover cap of the airbag module.

From prior art numerous emblems are known which are attached to an outer face of the cover cap facing the occupant and are fixed there tightly and reliably so that they will not come off a front panel of the cover cap upon activation of the airbag module.

In order to achieve a defined reproducible deployment behavior of the airbag upon activation of the airbag module, the front panel of the cover cap usually has a so-called tear line, i.e. a weakened zone at which the front panel tears in a controlled manner when pressure is applied. This tear line defines front panel portions which can be pivoted like flaps and which enable the airbag to exit and deploy in the direction of the occupant. Usually, the tear line is guided around the emblem so that the emblem remains safely fastened to one of the flap-type front panel portions. Especially in the case of large emblems, this may result in shapes of the flap-type front panel portions that impair optimum deployment behavior of the airbag. Furthermore, emblems having a predetermined breaking point and breaking apart upon activation of the airbag module are known, wherein in such case care has to be taken, however, that there will not form any free emblem fragments.

Apart from safeguarding reduced resistance to deployment and defined deployment behavior of the airbag, the tear line also has to be sufficiently robust so that it will not inadvertently tear, for example, upon actuation of the horn during normal driving operation. Moreover, the tear line of the cover cap is intended not to be visible for the occupant.

SUMMARY OF THE INVENTION

It is the object of the invention to provide a cover cap adapted to be manufactured at low cost which is sufficiently robust during normal driving operation, safeguards defined deployment behavior of the airbag in the case of release of the airbag module and, moreover, permits great freedom in designing the emblem.

In accordance with the invention, this object is achieved by a cover cap for an airbag module, especially for a driver airbag module, comprising a front panel having an outer face as well as an opposed inner face which in the assembled state of the airbag module faces a folded airbag, and comprising an emblem including two separate emblem elements mounted on the front panel, wherein the front panel has a tear line along which the cover cap will tear upon activation of the assembled airbag module, and wherein the tear line extends between the two separate emblem elements. In this case, the tear line need not be guided around the complete emblem so that freer shaping of the flap-type front panel portions aiming at a desired deployment behavior of the airbag is possible. Especially, in this way also for large emblems flaps of approximately equal size can be realized in the front panel. Furthermore, upon activation of the airbag module the emblem does not break apart so that no undesired emblem fragments caused by breakage can form. Since the emblem has no predetermined breaking point or weakened zone, it is incidentally also more robust so that in normal everyday loading such as actuation of the horn inadvertent breaking is largely excluded.

A distance between the two emblem elements may amount to less than 8 mm, especially to less than 5 mm. Such closely adjacent arrangement causes the emblem elements to visually appear as a unit and in this way ensures a desired appearance of the entire emblem.

In one embodiment of the cover cap, an area of the front panel having the smallest distance between the two emblem elements defines a web portion, with the tear line extending through the web portion and extending eccentrically between the two emblem elements in the area of the web portion. In other words, between the two emblem elements the tear line is not centrally arranged but shows different distances from the emblem elements. In the area of the emblem which is preferably arranged centrally on the cover cap, the cover cap is weakened by emblem openings, recesses and/or the tear line, for example, and at the same time is locally stiffened by the assembly of the emblem elements. During normal driving operation, for instance when pressing down the cover cap for actuating a vehicle horn, the maximum load of the cover cap occurs in the central area of the web portion approximately centrally between the emblem elements. Therefore, displacement of the tear line out of said central area in the direction of a cover cap area which is stiffened by an emblem element reliably prevents the front panel from being inadvertently torn.

The tear line may be directly adjacent to the edge of either of the emblem elements in the area of the web portion. It is further also imaginable for the tear line to be even covered at least partially by either of the emblem elements in the area of the web portion on the outer face of the front panel. The highly loaded area of the cover cap extending centrally between the emblem elements thus is not weakened by the tear line. Instead, the tear line extends in a stiffened area of the cover cap which is directly adjacent to either of the emblem elements or is even covered by the latter.

According to another embodiment of the cover cap, an area of the front panel having the smallest distance between the two emblem elements defines a web portion through which the tear line extends, wherein the front panel has a weakened wall in the area of the tear line and a remaining residual wall thickness, and wherein the front panel in the area of the web portion has a residual wall thickness which is larger than a residual wall thickness outside the web portion. During normal driving operation of the vehicle, the cover cap is especially highly loaded, as already mentioned before, in the area of the usually centrally located and comparatively short web portion, for example upon actuation of the vehicle horn. The larger residual wall thickness in the area of the web portion reliably helps prevent inadvertent tearing of the front panel in a simple manner during normal driving operation without excessively increasing the resistance to deployment of the cover cap when the airbag module is activated.

According to another embodiment of the cover cap, the tear line is formed by a wall recess provided at the inner face of the front panel, especially by a linear, trough-shaped wall recess or notch. In this way, the tear line is not visible for a vehicle occupant.

The emblem elements are preferably attached to the outside of the front panel and are anchored to the front panel. For this purpose, at the emblem elements pins which are preferably formed integrally with the emblem elements may be provided on front panel side. The pins are fusible pins, for example, which engage in associated holes of the front panel and are subsequently heated and deformed. Alternatively, also locking pins which are locked in the front panel holes are imaginable.

Incidentally, the invention also relates to an airbag module for a vehicle occupant restraint system, comprising a module housing which includes an afore-described cover cap, an airbag which in the deactivated airbag module is accommodated as folded airbag package in the module housing and an inflator for inflating the airbag upon activation of the airbag module.

BRIEF DESCRIPTION OF THE DRAWINGS

Further features and advantages of the invention will be evident from the following description of a preferred embodiment with reference to the drawings, wherein.

DESCRIPTION

Figure 4:
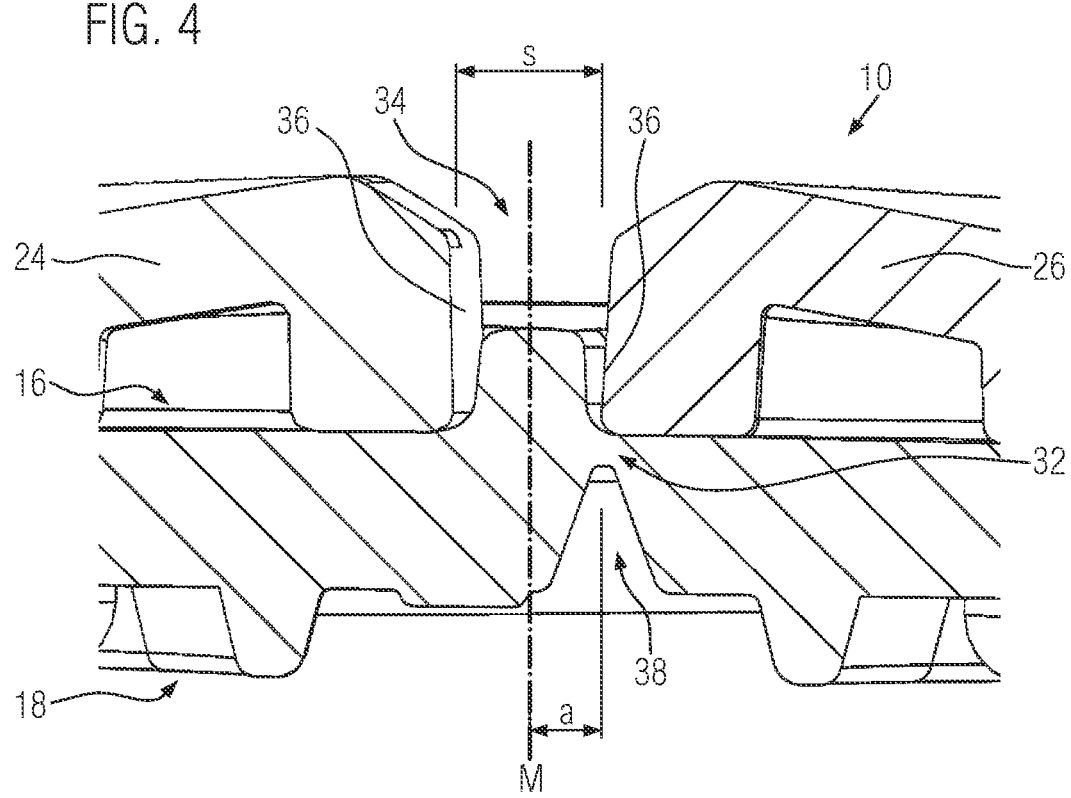
FIG. 4 shows a section detail of the cover cap according to FIG. 3 in an area between the two emblem elements of the emblem.
Figure 5:
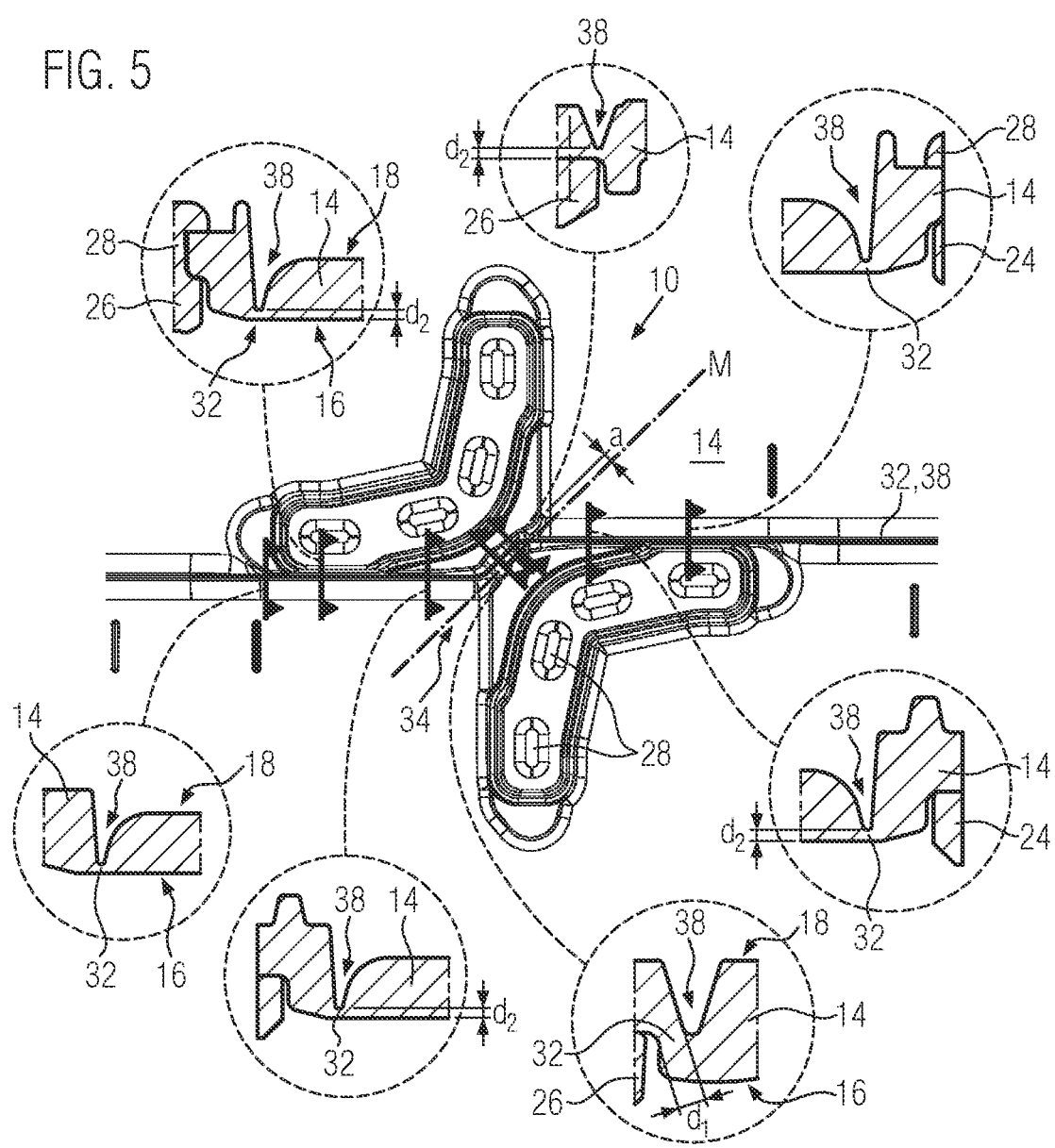
FIG. 5 shows a view of an inner face of the cover cap according to FIG. 1 after mounting the emblem as well as plural section details of the cover cap.
Figure 6:
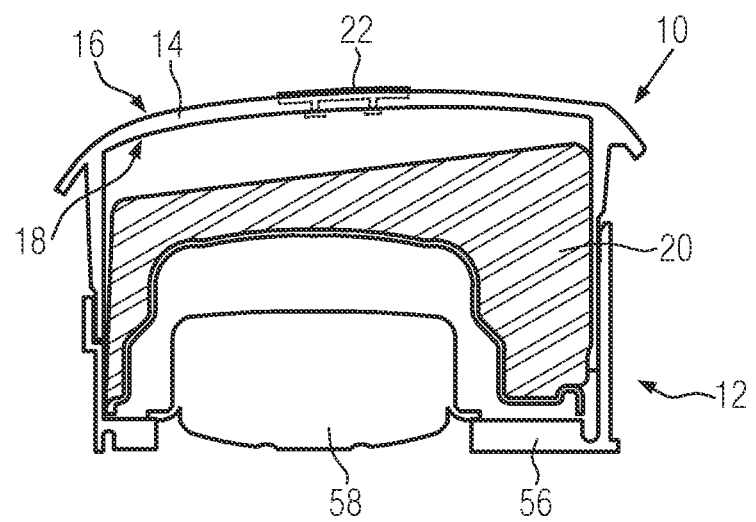
FIG. 6 shows a schematic section across an airbag module according to the invention comprising a cover cap according to the invention.

FIGS. 1 to 5 illustrate a cover cap 10 of an airbag module 12 schematically shown in FIG. 6 comprising a front panel 14 including an outer face 16 as well as an opposed inner face 18 facing a folded airbag 20 in the assembled state of the airbag module 12, and comprising an emblem 22 including two separate emblem elements 24, 26 fastened to the front panel 14.

The emblem elements 24, 26 are attached to the outer face of the front panel 14 and are anchored to the front panel 14. According to FIG. 1, for this purpose on the front panel side plural pins 28 are provided, especially integrally formed at the emblem elements 24, 26. In the shown embodiment, said pins 28 are fusible pins which during assembly of the emblem 22 engage in associated holes 30 of the front panel 14 and then are plastically deformed while thermal energy is supplied. By the plastic deformation the fusible pins are widened at their free ends and overlap the edges of the front panel holes 30 (cf. FIG. 5) so that finally the emblem 22 is fixed tightly and reliably to the front panel 14.

Figure 1:
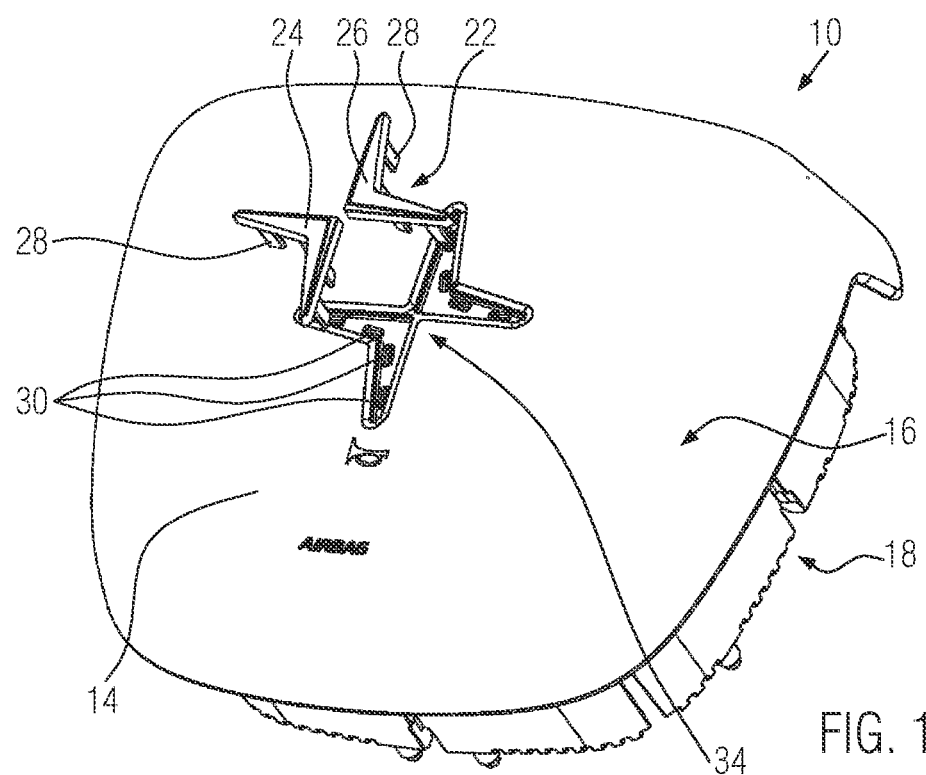
FIG. 1 shows a perspective exploded view of a cover cap according to the invention comprising a two-part emblem.
Figure 2:
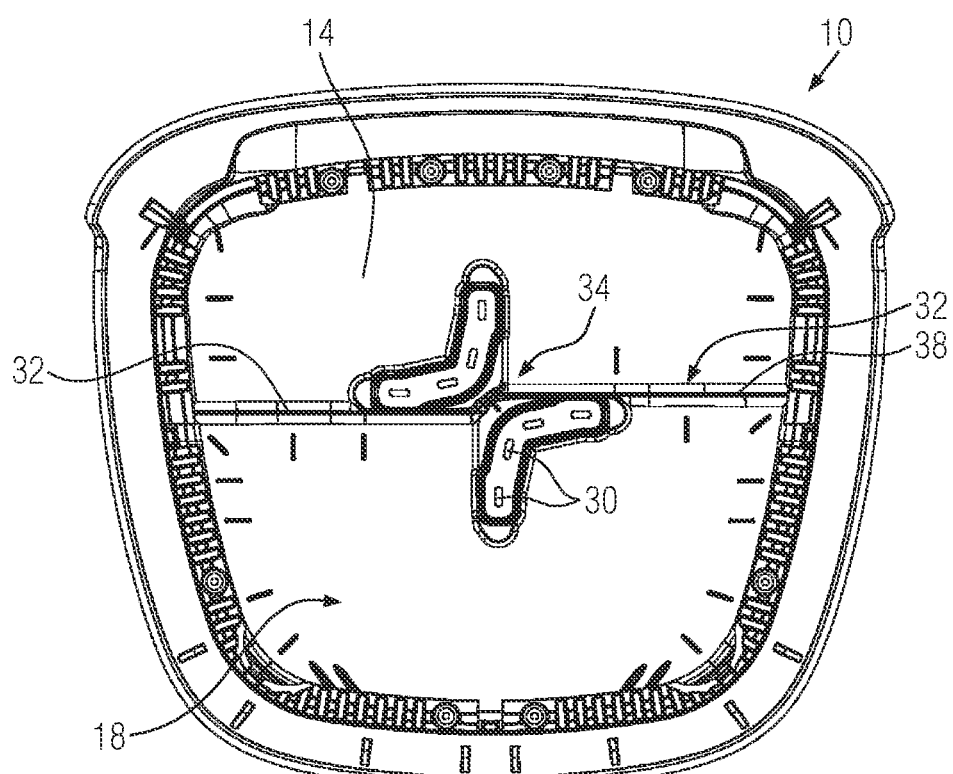
FIG. 2 shows a view of an inner face of the cover cap according to FIG. 1 before mounting the emblem.

By way of the inside view of the cover cap 10 according to FIG. 2, it is clearly evident that the front panel 14 includes a tear line 32 along which the cover cap 10 tears upon activation of the assembled airbag module 12, the tear line 32 extending between the two separate emblem elements 24, 26 of the emblem 22.

Figure 3:
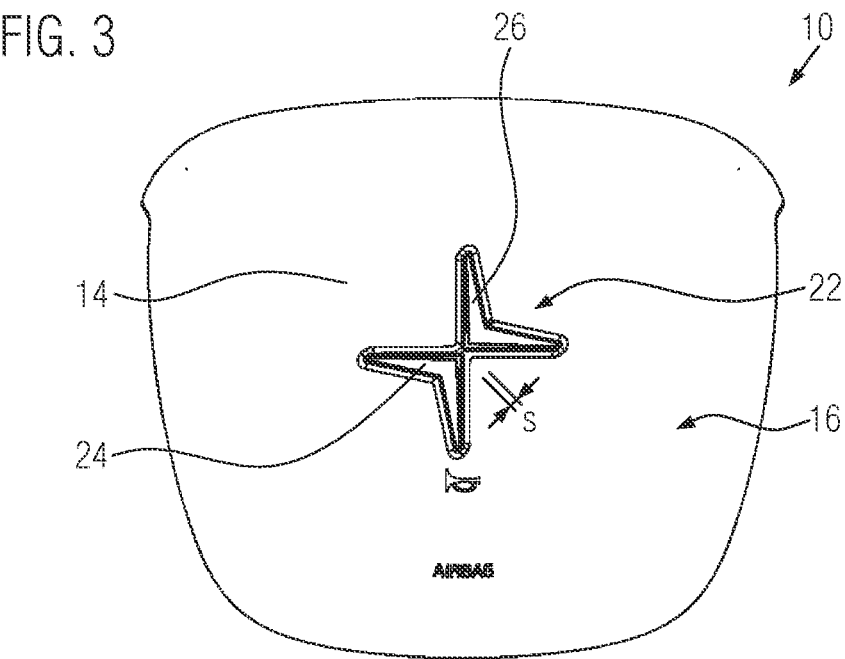
FIG. 3 shows a view of an outer face of the cover cap according to FIG. 1 after mounting the emblem.

FIG. 3 illustrates an outside view of the cover cap 10, concretely speaking a top view onto the outer face 16 of the front panel 14 and the emblem 22 fastened to the front panel 14. Here it becomes clear that the two emblem elements 24, 26 of the emblem 22 are located very closely to each other. In this case, a distance s between the two emblem elements 24, 26 amounts to less than 8 mm, especially to less than 5 mm.

An area of the front panel 14 having the smallest distance s between the two emblem elements 14, 16 defines a web portion 34, wherein FIG. 4 illustrates a section detail of the cover cap 10 in the area of said web portion 34. In FIG. 4, also a central axis M is inserted between the emblem elements 24, 26, the central axis M in this case also corresponding to an axis of symmetry of the emblem 22.

The tear line 32 extends in the area of the web portion 34 eccentrically between the two emblem elements 24, 26, and thus exhibits an eccentricity a and, thus, different distances from the two emblem elements 24, 26.

In accordance with FIG. 4, the tear line 32 is formed by a linear wall recess 38 provided at the inner face 18 of the front panel 14 and in the area of the web portion 34 is directly adjacent to the edge 36 of either of the emblem elements 24, 26. Especially, the tear line 32 even may be partially covered by said emblem element 26 in the area of the web portion 34 on the outer face 16 of the front panel 14.

FIG. 5 illustrates a detailed view of the inner face 18 of the cover cap in the area of the emblem 22 mounted on the front panel 14 as well as plural section details of the cover cap 10 at different locations of the tear line 32.

The tear line 32 extends transversely across a central area of the front panel 14, especially also through the web portion 34 between the two emblem elements 24, 26, with the front panel 14 exhibiting a weakened wall as well as a remaining residual wall thickness $d_1$, $d_2$ in the area of the tear line 32. By way of the section detail in FIG. 5, it is evident that in the area of the web portion 34 the front panel 14 has a residual wall thickness $d_1$ which is larger than a residual wall thickness $d_2$ outside the web portion 34. The larger residual wall thickness $d_1$ may be provided especially in a partial area of the web portion 34 only and need not extend over the entire length thereof. In areas of the tear line 32 which are relatively highly stressed by an actuation of the horn, for example, the larger residual wall thickness $d_1$ provides for a local reinforcement of the front panel 14 so that inadvertent tearing of the cover cap 10 during normal driving operation can be largely excluded.

Finally, FIG. 6 illustrates a schematic section of the airbag module 12 for a vehicle occupant restraint system, comprising a module housing 40 which includes an afore-described cover cap 10, an airbag 20 which is accommodated as a folded airbag package in the module housing 40 when the airbag module 12 is deactivated, and an inflator 42 for inflating the airbag 20 upon activation of the airbag module 12.

The illustrated airbag module 12 in this case is a driver airbag module and, after being mounted, is disposed in the hub area of a vehicle steering wheel.

The invention claimed is:

1. A cover cap for an airbag module (12), comprising:
a front panel (14) including an outer face (16) as well as an opposed inner face (18) which in an assembled state of the airbag module (12) faces a folded airbag (20), and
an emblem (22) including two separate emblem elements (24, 26) fastened to the front panel (14),
wherein the front panel (14) has a tear line (32) along which the cover cap (10) tears upon activation of the assembled airbag module (12),
wherein the tear line (32) extends between the two separate emblem elements (24, 26) in a manner configured so that the emblem elements (24, 26) do not break apart when the front panel (14) tears along the tear line (32).

2. The cover cap according to claim 1, wherein a distance (s) between the two emblem elements (24, 26) amounts to less than 8 mm.

3. The cover cap according to claim 1, wherein the front panel (14) has a weakened wall as well as a remaining residual wall thickness in an area of the tear line (32), and the front panel (14) in an area of the web portion (34) having a residual wall thickness ($d_1$) larger than a residual wall thickness ($d_2$) outside the web portion (34).

4. The cover cap according to claim 1, wherein the tear line (32) is formed by a panel recess (38) provided at the inner face (18) of the front panel (14).

5. The cover cap according to claim 1, wherein the emblem elements (24, 26) are attached to the outer face of the front panel (14) and are anchored to the front panel (14).

6. An airbag module for a vehicle occupant restraint system, comprising:
a module housing (40) which includes a cover cap (10) according to claim 1,
an airbag (20) which is accommodated in the module housing (40) as a folded airbag package when the airbag module (12) is deactivated, and
an inflator (42) for inflating the airbag (20) upon activation of the airbag module (12).

7. The cover cap according to claim 1, wherein an area of the front panel (14) having a smallest distance between the two emblem elements (24, 26) defines a web portion (34), with the tear line (32) in the area of the web portion (34) extending eccentrically between the two emblem elements (24, 26).

8. The cover cap according to claim 7, wherein in an area of the web portion (34) the tear line (32) is directly adjacent to an edge (36) of either of the web elements (24, 26).

9. The cover cap according to claim 7, wherein in the area of the web portion (34) the tear line (32) is covered at least partially by either of the emblem elements (24, 26) on the outer face (16) of the front panel (14).

10. A cover cap for an airbag module (12), comprising:
a front panel (14) including an outer face (16) as well as an opposed inner face (18) which in an assembled state of the airbag module (12) faces a folded airbag (20), and
an emblem (22) including two separate emblem elements (24, 26) fastened to the front panel (14),
wherein the front panel (14) has a tear line (32) along which the cover cap (10) tears upon activation of the assembled airbag module (12),
wherein the tear line (32) extends between the two separate emblem elements (24, 26),
wherein an area of the front panel (14) in which a distance between the two emblem elements (24, 26) is smallest defines a web portion (34), with the tear line (32) in an area of the web portion (34) extending eccentrically between the two emblem elements (24, 26), and wherein the front panel (14) has a weakened wall as well as a remaining residual wall thickness in an area of the tear line (32), and the front panel (14) in the area of the web portion (34) has a residual wall thickness ($d_1$) larger than a residual wall thickness ($d_2$) outside the web portion (34).

11. The cover cap according to claim 10, wherein a distance (s) between the two emblem elements (24, 26) amounts to less than 8 mm.

12. The cover cap according to claim 10, wherein in the area of the web portion (34) the tear line (32) is directly adjacent to an edge (36) of either of the two emblem elements (24, 26).

13. The cover cap according to claim 10, wherein in the area of the web portion (34) the tear line (32) is covered at least partially by either of the emblem elements (24, 26) on the outer face (16) of the front panel (14).

14. The cover cap according to claim 10, wherein the tear line (32) is formed by a panel recess (38) provided at the inner face (18) of the front panel (14).

15. The cover cap according to claim 10, wherein the emblem elements (24, 26) are attached to the outer face of the front panel (14) and are anchored to the front panel (14).

16. An airbag module for a vehicle occupant restraint system, comprising:
a module housing (40) which includes a cover cap (10) according to claim 10,
an airbag (20) which is accommodated in the module housing (40) as a folded airbag package when the airbag module (12) is deactivated, and
an inflator (42) for inflating the airbag (20) upon activation of the airbag module (12).

17. A cover cap for an airbag module (12), comprising:
a front panel (14) including an outer face (16) as well as an opposed inner face (18) which in an assembled state of the airbag module (12) faces a folded airbag (20), and
an emblem (22) including two separate emblem elements (24, 26) fastened to the front panel (14),
wherein the front panel (14) has a tear line (32) along which the cover cap (10) tears upon activation of the assembled airbag module (12),
wherein the emblem elements (24, 26) do not extend completely across the tear line (32), and
wherein the tear line (32) extends between the two separate emblem elements (24, 26).

* * * * *